US010666384B2

(12) United States Patent
Dalsgaard et al.

(10) Patent No.: US 10,666,384 B2
(45) Date of Patent: May 26, 2020

(54) HANDLING DIFFERENT TYPES OF RSRQ MEASUREMENTS BASED ON OFFSETS

(71) Applicant: Nokia Technologies Oy, Espoo (FI)

(72) Inventors: Lars Dalsgaard, Oulu (FI); Jorma Johannes Kaikkonen, Oulu (FI); Sari Kaarina Nielsen, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/312,459

(22) PCT Filed: May 22, 2014

(86) PCT No.: PCT/US2014/039165
§ 371 (c)(1),
(2) Date: Nov. 18, 2016

(87) PCT Pub. No.: WO2015/178911
PCT Pub. Date: Nov. 26, 2015

(65) Prior Publication Data
US 2017/0126357 A1    May 4, 2017

(51) Int. Cl.
*H04L 1/00* (2006.01)
*H04B 17/318* (2015.01)
(Continued)

(52) U.S. Cl.
CPC ......... *H04L 1/0026* (2013.01); *H04B 17/309* (2015.01); *H04B 17/318* (2015.01); *H04B 17/327* (2015.01); *H04L 5/0048* (2013.01)

(58) Field of Classification Search
CPC ... H04L 5/0053; H04L 5/0032; H04L 1/0026; H04L 5/0057
See application file for complete search history.

(56) References Cited

U.S. PATENT DOCUMENTS

2011/0250919 A1* 10/2011 Barbieri ............... H04L 1/0026
                                                    455/509
2013/0196603 A1   8/2013 Gheorghiu et al.
(Continued)

FOREIGN PATENT DOCUMENTS

WO    2012112184 A1    8/2012
WO    2013036060 A1    3/2013
(Continued)

OTHER PUBLICATIONS

International Search Report and Written Opinion received for corresponding Patent Cooperation Treaty Application No. PCT/US2014/039165, dated Feb. 4, 2015, 12 pages.
(Continued)

*Primary Examiner* — Raj Jain
(74) *Attorney, Agent, or Firm* — Mintz Levin Cohn Ferris Glovsky and Popeo, P.C.

(57) ABSTRACT

Methods and apparatus, including computer program products, are provided for RSRQ measurements. In one aspect there is provided a method. The method may include receiving, at a user equipment, measurement configuration information including at least one value for a first type of reference signal received quality measurement; detecting, at the user equipment, whether an offset is received from the network; adjusting the at least one value in accordance with the detected offset to enable a second type of reference signal received quality measurement at the user equipment; and activating the second type of reference signal received quality measurement configured with the adjusted at least one value. Related apparatus, systems, methods, and articles are also described.

20 Claims, 4 Drawing Sheets

(51) Int. Cl.
  *H04L 5/00* (2006.01)
  *H04B 17/309* (2015.01)
  *H04B 17/327* (2015.01)

(56) References Cited

U.S. PATENT DOCUMENTS

| | | | |
|---|---|---|---|
| 2013/0324133 A1* | 12/2013 | Li | H04W 36/20 |
| | | | 455/444 |
| 2014/0073314 A1 | 3/2014 | Pradas et al. | |
| 2014/0295883 A1 | 10/2014 | Kang et al. | |
| 2014/0329553 A1* | 11/2014 | Nakashima | H04W 52/365 |
| | | | 455/522 |
| 2015/0156690 A1* | 6/2015 | Futaki | H04W 48/20 |
| | | | 455/436 |
| 2017/0126357 A1* | 5/2017 | Dalsgaard | H04B 17/309 |

FOREIGN PATENT DOCUMENTS

| WO | 2012116272 A1 | 8/2013 |
|---|---|---|
| WO | 2014010477 A1 | 1/2014 |
| WO | 2014070035 A1 | 5/2014 |

OTHER PUBLICATIONS

3GPP, "Technical Specification Group Radio Access Network; Evolved Universal Terrestrial Radio Access (E-UTRA); LTE Physical layer; General description (Release 13)," 3rd Generation Partnership Project, 3GPP TS 36.201 V13.2.0, 14 pages, Jun. 2016.

3GPP, "Technical Specification Group Radio Access Network; Evolved Universal Terrestrial Radio Access (E-UTRA); Multiplexing and channel coding (Release 14)," 3rd Generation Partnership Project, 3GPP TS 36.212 V14.0.0, 148 pages, Sep. 2016.

3GPP, "Technical Specification Group Radio Access Network; Evolved Universal Terrestrial Radio Access (E-UTRA); Physical channels and modulation (Release 13)," 3rd Generation Partnership Project, 3GPP TS 36.211 V13.2.0, 168 pages, Jun. 2016.

3GPP, "Technical Specification Group Radio Access Network; Evolved Universal Terrestrial Radio Access (E-UTRA); Physical layer procedures (Release 12)," 3rd Generation Partnership Project, 3GPP TS 36.213 V12.5.0, 239 pages, Mar. 2015.

3GPP, "Technical Specification Group Radio Access Network; Evolved Universal Terrestrial Radio Access (E-UTRA); Physical layer; Measurements (Release 13)," 3rd Generation Partnership Project, 3GPP TS 36.214 V13.3.0, 20 pages, Sep. 2016.

* cited by examiner ately defined as the reference symbol received power (RSRP) divided by received signal strength indicator (RSSI). Table 1 below depicts an example definition of RSRQ in accordance with 3GPP TS 36.214.
HANDLING DIFFERENT TYPES OF RSRQ MEASUREMENTS BASED ON OFFSETS

RELATED APPLICATION

This application was originally filed as Patent Cooperation Treaty Application No. PCT/US2014/039165 filed May 22, 2014.

FIELD

The subject matter described herein relates to wireless communications.

BACKGROUND

Robust mobility management may enable offloading and other actions based on mobility measurements. Some of these mobility measurements may include reference signal received quality (RSRQ) for radio resource management as well as other mobility measurements. In the case of RSRQ, it is generally defined as the reference symbol received power (RSRP) divided by received signal strength indicator (RSSI). Table 1 below depicts an example definition of RSRQ in accordance with 3GPP TS 36.214.

TABLE 1

| | |
|---|---|
| Definition | Reference Signal Received Quality (RSRQ) is defined as the ratio N × RSRP/(E-UTRA carrier RSSI), where N is the number of RB's of the E-UTRA carrier RSSI measurement bandwidth. The measurements in the numerator and denominator shall be made over the same set of resource blocks. E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches. |
| Applicable for | RRC_IDLE intra-frequency, RRC_IDLE inter-frequency, RRC_CONNECTED intra-frequency, RRC_CONNECTED inter-frequency |

There are currently two different types of RSRQ metrics being used in E-UTRAN. The first kind of RSRQ metric ("old RSRQ") is defined, so that the UE measures the RSSI from symbols only in which the Common Reference Symbols (CRS) are present. The second kind of RSRQ metric ("new RSRQ") is defined for the case of, for example, enhanced Inter-cell interference coordination (eICIC). In this second type of RSRQ, it specifies that the RSSI be measured from all of the symbols of a subframe.

SUMMARY

Methods and apparatus, including computer program products, are provided for different measurement types.

In some example embodiments, there is provided a method. The method may include receiving, at a user equipment, measurement configuration information including at least one value for a first type of reference signal received quality measurement; detecting, at the user equipment, whether an offset is received from the network; adjusting the at least one value in accordance with the detected offset to enable a second type of reference signal received quality measurement at the user equipment; and activating the second type of reference signal received quality measurement configured with the adjusted at least one value.

In some example embodiments, there is provided a method, which may include sending, by a base station, measurement configuration information including at least one value for a first type of reference signal received quality measurement; and sending, by the base station, an offset to signal a user equipment to use a second type of reference signal received quality measurement at the user equipment.

In some variations, one or more of the features disclosed herein including the following features can optionally be included in any feasible combination. The first type of reference signal received quality may be determined based on a reference symbol received power divided by a received signal strength indicator, wherein the received signal strength indicator is measured from symbols only in which common reference symbols are present. The second type of reference signal received quality may be determined based on a reference symbol received power divided by a received signal strength indicator, wherein the received signal strength indicator is measured from all of the symbols of a subframe. The adjusting may be specific to one or more cells. The adjusting may be specific to one or more carriers. The adjusting may be specific to one or more measurement events. When the offset is detected, the user equipment may determine that the second type of reference signal received quality measurement is to be activated at the user equipment. The detecting may further comprises detecting an indicator representative the second type of reference signal received quality measurement being activated at the user equipment. When the user equipment does not receive at least one of the indicator or the offset, the user equipment may enable the first type of reference signal received quality measurement. The method may further include receiving at least one of the indicator or the offset via at least one of a broadcast, a system information block, radio resource control signaling, or dedicated signaling and measuring, at the user equipment, a difference between the first type of reference signal received quality measurement and the second type of reference signal received quality measurement.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
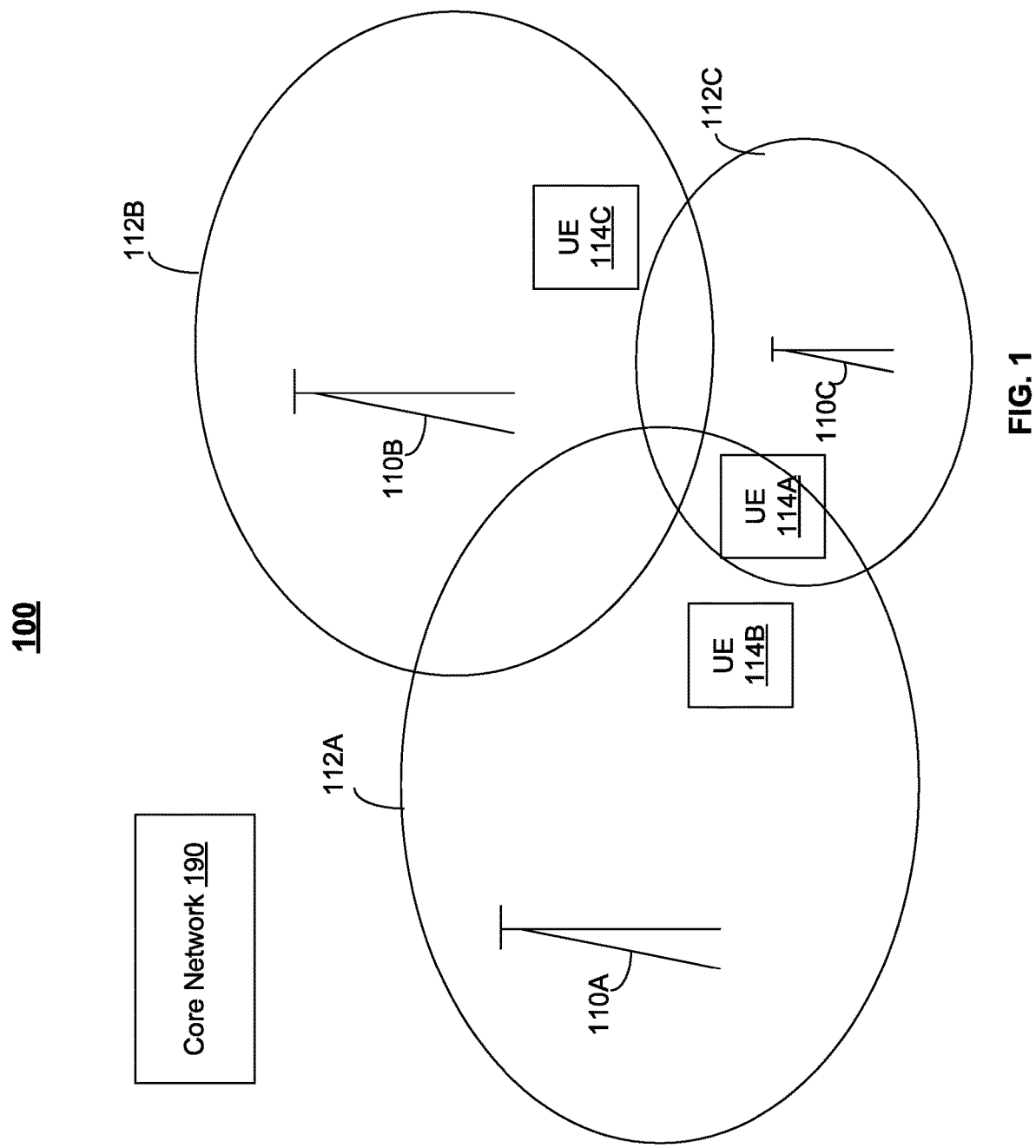
FIG. 1 depict an example of a system for handling different types of RSRQ measurements, in accordance with some exemplary embodiments.

Like labels are used to refer to same or similar items in the drawings.

DETAILED DESCRIPTION

RSRQ measurements may, as noted, be performed using different types of measurements. The new RSRQ may provide an RSRQ metric that more accurately reflects the instantaneous load in for example low load conditions, compared to the old RSRQ definition. These two RSRQ metrics types may also have different behavior with respect to amount of handovers, radio link failures, and the like. Although using the new RSRQ metric may provide some benefits when more aggressive offloading strategies (for example, to a small cell) are sought, the old RSRQ metric may provide more stable performance. As such, there may be a role for both types of RSRQ metrics at a UE.

The two RSRQ metric types may, as noted, produce different behaviors/results given similar conditions. Moreover, some legacy UE may support the old RSRQ but not the new RSRQ, while other UE may support the new RSRQ metric and/or the old metric. This environment may lead to a more complicated network operation, so the network may need to account for the different UE behaviors with respect to RSRQ, and, as such, provide different sets of configuration information for each RSRQ measurement type. For example, the old RSRQ measurement type may have some parameters, thresholds, and/or other configurations that are different from the new RSRQ metric type.

Although some of the examples refer to an old RSRQ measurement and a new RSRQ measurement, these two types are merely examples as other types of RSRQ and/or metrics may be used as well.

In some example embodiments, the network, such as a base station, may signal one or more adjustments (for example, offsets, changes, or deltas) to the UE. The UE may then be required to apply the adjustments in order to use the new RSRQ measurement or apply the adjustments to the conditions associated with the RSRQ measurement. The adjustments may, in some example embodiments, be specific to for example one or more cells, carriers, and/or measurement events. For example, the network may signal to the UE an adjustment to a threshold that triggers at the UE event reporting to the base station. To illustrate by way of an example, the network may signal an adjustment to an RSRQ threshold used for RRC Event A5 Event (serving cell becomes worse than a first threshold and a neighbor cell becomes better than a second threshold). In this example, the network may provide the first and second thresholds to the UE, but these thresholds may be specific to the old RSRQ measurement, but the adjustments (or offsets) may be used to adjust the first and second thresholds to values corresponding to the new RSRQ measurement.

In some example embodiments, the network may explicitly signal the UE with an indication to use the old RSRQ or new RSRQ. In some example embodiments, the network may implicitly signal which type of RSRQ measurement should be performed at the UE. For example, the presence (or absence) of the adjustment information (which is sent by the network) may also be used as an implicit indication to the UE regarding which metric to use for RSRQ measurements. For example, if the network provides the adjustment information to the UE, this may implicitly indicate to the UE that the new RSRQ measurement should be used. This adjustment may also enable the UE to adjust the baseline configuration for the old RSRQ (for example to operate in accordance with the new RSRQ metric). Similarly, if the network does not provide the adjustment information to the UE, this may also implicitly indicate to the UE that the old RSRQ measurement should be used.

However, if the UE does not receive any adjustment or indication concerning which RSRQ metric to use, the UE may, in some example embodiments, implement a default configuration, such as use the old RSRQ metric. Moreover, this default to use the old RSRQ measurement may be implemented even when the UE supports the new RSRQ metric.

Rather than provide signaling offsets for both connected and idle modes, the new RSRQ metric may, in some example embodiments, be defined for connected mode only, so that in idle mode a UE may use the old RSRQ definition even when the UE supports the new RSRQ definition.

Alternatively or additionally, the new RSRQ may, in some example embodiments, be configured in the idle mode as well. For example, the UE may be signaled and/or configured for the new RSRQ in idle mode in a radio resource control (RRC) Connection release message (for example, using existing settings from RRC Connected mode). This may help ensure fewer changes to idle mode.

In some example embodiments, the network may signal (via dedicated signaling or a broadcast) one or more adjustments, such as offsets, that a UE may be required to apply in order to use the new RSRQ measurements and/or the thresholds used to evaluate event triggering (in connected mode) or cell selection (re-selection or suitability in idle mode) when the new RSRQ is being measured. This signaling may enable a more consistent system level behavior among a plurality of UE using the old and/or new RSRQ as well as simplify associated network signaling to configure the RSRQ types. For example, the presence of the one or more offsets may, in some example embodiments, also be an indication to the UE regarding which RSRQ metric to use when the UE supports both the old and new RSRQ metric. Specifically, a legacy UE would not be signaled the offset in connected mode, nor would this legacy UE decode or understand the signaling extensions in the idle mode, so the legacy UE behavior would be unchanged. On the other hand, a UE which supports the new RSRQ may be signaled the offset in connected mode, and would understand the signaling extensions in the idle mode.

When a new RSRQ metric is to be used at a UE, a corresponding adjustment or offset may be defined as well for the new RSRQ measurement and/or an associated condition, threshold, configuration, and the like. As noted, the adjustment may be a value to adjust a threshold (for example, thresholds used in RRC Event reporting as noted above) to take into account the use of the new RSRQ, rather the old RSRQ. This may enable the network to for example use common/baseline measurement configuration definitions to signal all of the plurality of UE in such a way that only one common set parameters are needed but can be adjusted by offsets to accommodate the new RSRQ measurements. In this way, the same common measurement configuration definitions may be signaled to a plurality of UE, some of which may implement the old RSRQ measurement and some may implement the new RSRQ measurement, but in the case of the new RSRQ measurement an adjustment (for example, an offset, a change, a delta, and the like) may be separately signaled to the UE and then applied by the UE to accommodate the new RSRQ measurement.

To illustrate, the network may signal the UE an offset in the form of a power change (for example, in dB) to adjust a threshold parameter or in the form of time to change in a time to trigger (TTT) parameter. Both of these offsets (or deltas) may thus adjust a baseline configuration, such as a signaled configuration for the old RSRQ, to accommodate another configuration, such as the new RSRQ measurement. Moreover, this signaled offset/delta may be specific to one or more cells, specific to one or more carriers, and/or specific to one or more measurement events. In this way the network can signal the same baseline configuration to legacy UE (which only support the old measurement) and other UE (which support the new RSRQ), but send adjustments that can be interpreted by the other UE supporting the new RSRQ (while not impacting the legacy UE).

In the case of Idle mode and cell (re-)selections, a separate adjustment value, such as an additional delta or additional hysteresis value (for example, a positive or negative delta or a smaller or higher hysteresis) may be defined and signaled to the UE, when the network configures the UE to use the new RSRQ measurement to avoid changing the cell (re-) selection behavior of legacy UE using the old RSRQ measurement metric. Additionally or alternatively, the additional adjustment (which may be a delta value or additional hysteresis) may allow cell reselection optimizations for UE, which support the new RSRQ measurement metric. The network may thus configure a UE to use the new RSRQ measurement when more aggressive mobility, such as offloading to other cells including small cells is sought. Moreover, the network may thus be able to more aggressively offload newer UE supporting the new RSRQ measurement metric from a macrocell to small cells as these newer UE may be more likely to support other small cell mobility features/enhancements. For example, in low or medium traffic load situations on the small cell frequency layer, the new RSRQ measurement metric may be more aggressive in pushing newer UE from the macrocell to the small cells, whereas legacy UE (which do not support the new RSRQ) may be more likely to stay at the macrocell.

The same rules could be utilized both for idle and connected mode UEs. Connected mode UE may be controlled even more accurately by the network especially when the UE is in active data transmission and/or reception so longer discontinuous receive (DRX) cycles are not being used (which makes UE measurements like RSRQ measurements less accurate). In some example embodiments, the Idle mode control of the UE may be configured with the necessary settings during a connection release. This may have the benefits that network would have control of which UE's would be using the new metric and the necessary settings.

Before providing additional examples regarding the use of different types of RSRQ measurements, the following provides a description of an example of a system, in accordance with some example embodiments.

FIG. 1 depicts a system 100 including a core network 190 which may be coupled via one or more backhaul links/ networks to a plurality of base stations, such as base stations 110A-C serving cells 112A-C, and corresponding user equipment 114A-C. Although FIG. 1 depicts a certain quantity and configuration of devices, other quantities and configurations may be implemented as well. For example, other quantities and configurations of base stations/access points, cells, and user equipment may be implemented as well.

In some example embodiments, user equipment, such as 114A-C, may be implemented as a mobile device and/or a stationary device. The user equipment may be referred to as, for example, a wireless device, a mobile station, a mobile unit, a subscriber station, a wireless terminal, a tablet, a smart phone, and/or the like. In some example embodiments, user equipment may be implemented as multi-mode user devices configured to operate using a plurality of radio access technologies, although a single-mode device may be used as well. For example, user equipment may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells. Some of the user equipment may be support the old RSRQ measurements, and some user equipment may support the new RSRQ measurement.

The base stations, such as base stations 110A-C may, in some example embodiments, be configured as an evolved Node B (eNB) type base station, although other types of base stations and wireless access points may be used as well. In the case of eNB type base station, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations may also be configured to serve cells using a WLAN technology, such as WiFi (for example, the IEEE 802.11 series of standards), as well as any other radio access technology capable of serving a cell. In the example of FIG. 1, base station/access point 110C may be configured to serve small cell using WiFi, although any other radio access technology may be used as well. The base stations may have wired and/or wireless backhaul links to other networks and/or network nodes including core network 190. Although some of the examples described herein refer to E-UTRAN, other types of networks, such as UTRAN (UMTS Terrestrial Radio Access Network), GERAN (GSM EDGE Radio Access network), WCDMA (Wideband Code Division Multiple Access), HSPA (High Speed Packet Access), and/or any other type of radio network. Moreover, the base stations may be configured to send measurement configuration information including at least one value for a first type of reference signal received quality measurement and send an offset to signal a user equipment to use a second type of reference signal received quality measurement at the user equipment.

Figure 2:
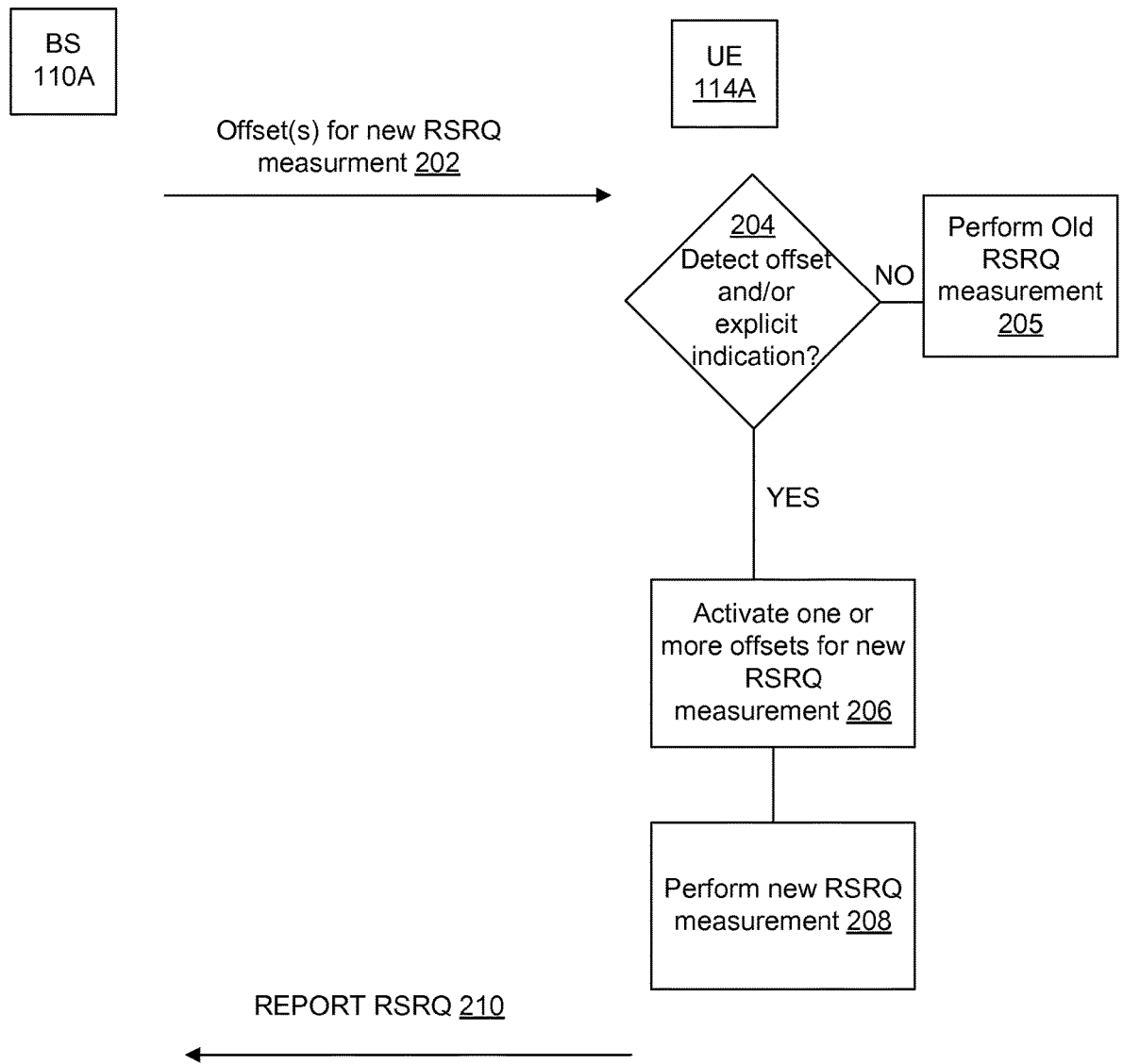
FIG. 2 depict an example of a process for handling different types of RSRQ measurements, in accordance with some exemplary embodiments.

FIG. 2 depicts an example process 200 for handling different types of RSRQ measurements, in accordance with some example embodiments. The description of process 200 also refers to FIG. 1.

At 202, the network, such as base station 110A, may signal (via dedicated signaling and/or a broadcast) one or more offsets to a UE, such as UE 114A, in accordance with some example embodiments. The one or more offsets may be used by UE 114A for the new RSRQ measurement type. For example, the network may signal to the UE a change in power (for example, dB) to adjust a threshold parameter (or any other parameter) in order to use the new RSRQ measurement type. The offset may adjust configuration information signaled by the network specifically for the old RSRQ. In this way, the network can signal the same baseline configuration to all UE but send adjustments to those UE supporting the new RSRQ (while not affecting the legacy UE).

The signaling at 202 may be sent via dedicated RRC signaling, a broadcast, system information blocks (SIBs), and in other ways as well.

The signaling at 202 may, in some example, embodiments, specific to one or more cells, specific to one or more carriers, and/or specific to one or more measurement events.

The network may, in some example embodiments, send at 202 an explicit indication to use the new RSRQ measurement, so that the explicit indication together with the one or more offsets indicate the new RSRQ measurements is to be used at the UE. Although the signaling may explicitly indicate that the UE should use the new RSRQ measurement, the signaling at 202 may, in some example embodiments, implicitly indicate that the new RSRQ measurements are to be used by the UE. For example, the presence of the offset at 202 may signal that the UE is required to use the new RSRQ metric, when supported by the UE.

At 204, the UE 114A may determine whether the signaling received at 202 includes an explicit or implicit indication to use the new RSRQ measurement, in accordance with some example embodiments. If not, the UE 114A may continue at 205 with the old RSRQ measurement (which may be a default as noted above), in accordance with some example embodiments.

However, if the signaling does include an explicit or implicit indication to use the new RSRQ measurement, the UE 114A may activate at 206 some if not all of the one or more offsets simultaneously, in accordance with some example embodiments. Moreover, the activation may be only for certain offsets as well as deactivating certain offsets. For example, the network may provide at 202 an offset in the form of a change (or delta) to an existing measurement configuration. To illustrate further, the change may represent a value to be added (or subtracted) to the L1 or L3 filtered RSRQ measurement result or a change to the time-to-trigger of a measurement event. In this example, UE 114A may activate one or more of these received offsets by applying them to the measurement configuration to be used for the new RSRQ measurements. When the one or more offsets are activated, the UE cell re-selection behavior may be changed based on the new RSRQ measurements including the activated one or more offsets.

Moreover, the offset(s) signaled at 202 may indicate to the UE that the adjustments are for a certain cell, group of cells, carriers, measurement events, and/or combination of any of these. For example, an offset may be for a specific cell or cells, such as cell 112C. When this is the case, the UE 114A may activate the offset to the new RSRQ measurement of cell 112C. To illustrate by way of an example, if for example, the UE is required to use an offset for the new RSRQ of certain cells (or carriers) and checks the related event-triggered or cell reselection criteria, the UE may get to know for which cells or carriers this offset needs to be used, through explicit signaling indication (explicit list of cells) or implicitly where these cells or carriers belong to a certain group like higher priority inter-frequency cells or they use a certain feature.

At 208, the UE may then proceed to make the new RSRQ measurements in accordance with the offset, in accordance with some example embodiments. The RSRQ measurements performed at 208 or 205 may also be reported at 210 to the network.

In some example embodiments, the network may signal at 202 the UE to measure the difference between old and new RSRQ metrics to be used with the RSRQ measurements. For example, the UE may need to perform both old and new RSRQ measurements and identify what the difference is (for example, in dB or other value) between new and old RSRQ measurement results. This difference in old and new RSRQ measurement results from the UE may be utilized by the network in for example network decision making with respect to radio resource management. Alternatively or additionally, a UE may be required to take some actions, if the difference between old and new RSRQ is either bigger or small than for example a certain threshold. Moreover, the UE may signal to the network the offset(s) being used at the UE with the new RSRQ metric. The network signaling may be explicit or implicit and via dedicated signaling and/or a broadcast. For example, the network may, in some example embodiments, send an explicit indication to the UE to measure the difference between old and new RSRQ metrics to be used with the RSRQ measurements. Moreover, the network may signal that the difference measurements are to be performed for a certain cell, group of cells, carriers, measurement events, and/or combination of any of these.

Figure 3:
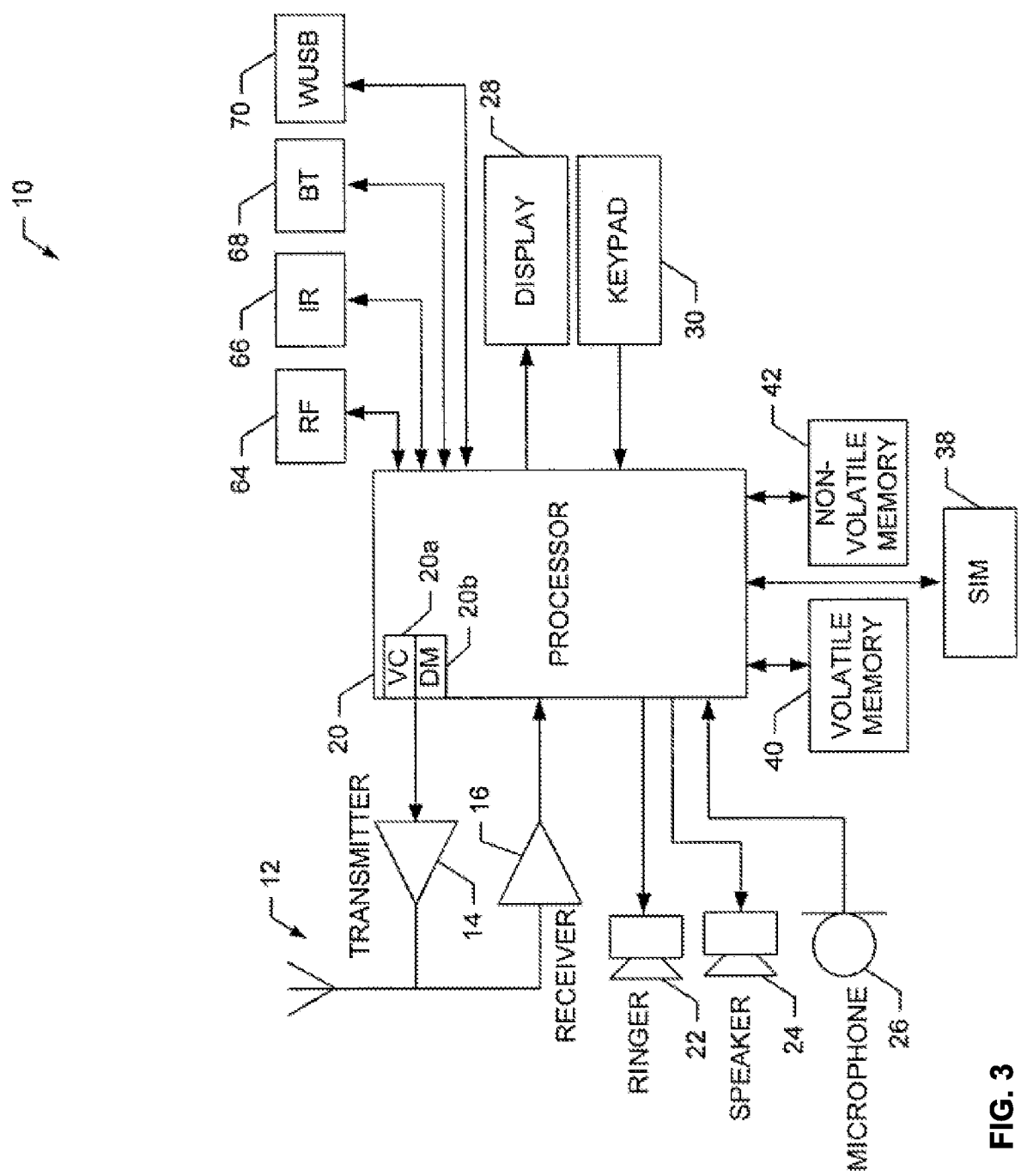
FIG. 3 depicts an example of a user equipment, in accordance with some exemplary embodiments.

FIG. 3 illustrates a block diagram of an apparatus 10, in accordance with some example embodiments. The apparatus 10 (or portions thereof) may be configured to provide a user equipment, a smart phone, a communicator, a machine type communication device, a wireless device, a wearable device, a cellular phone, a wireless sensor/device (for example, a wireless device which is part of a distributed architecture in for example, a car, a vehicle, a robot, a human, and/or the like).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed. The apparatus may also be configured to support point-to-point links to a base station and MBSFN (via for example a multicast or broadcast from one or more base stations).

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 200 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 200 including for example receiving, at a user equipment, measurement configuration information including at least one value for a first type of reference signal received quality measurement; detecting, at the user equipment, whether an offset is received from the network; adjusting the at least one value in accordance with the detected offset to enable a second type of reference signal received quality measurement at the user equipment; and activating the second type of reference signal received quality measurement configured with the adjusted at least one value.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
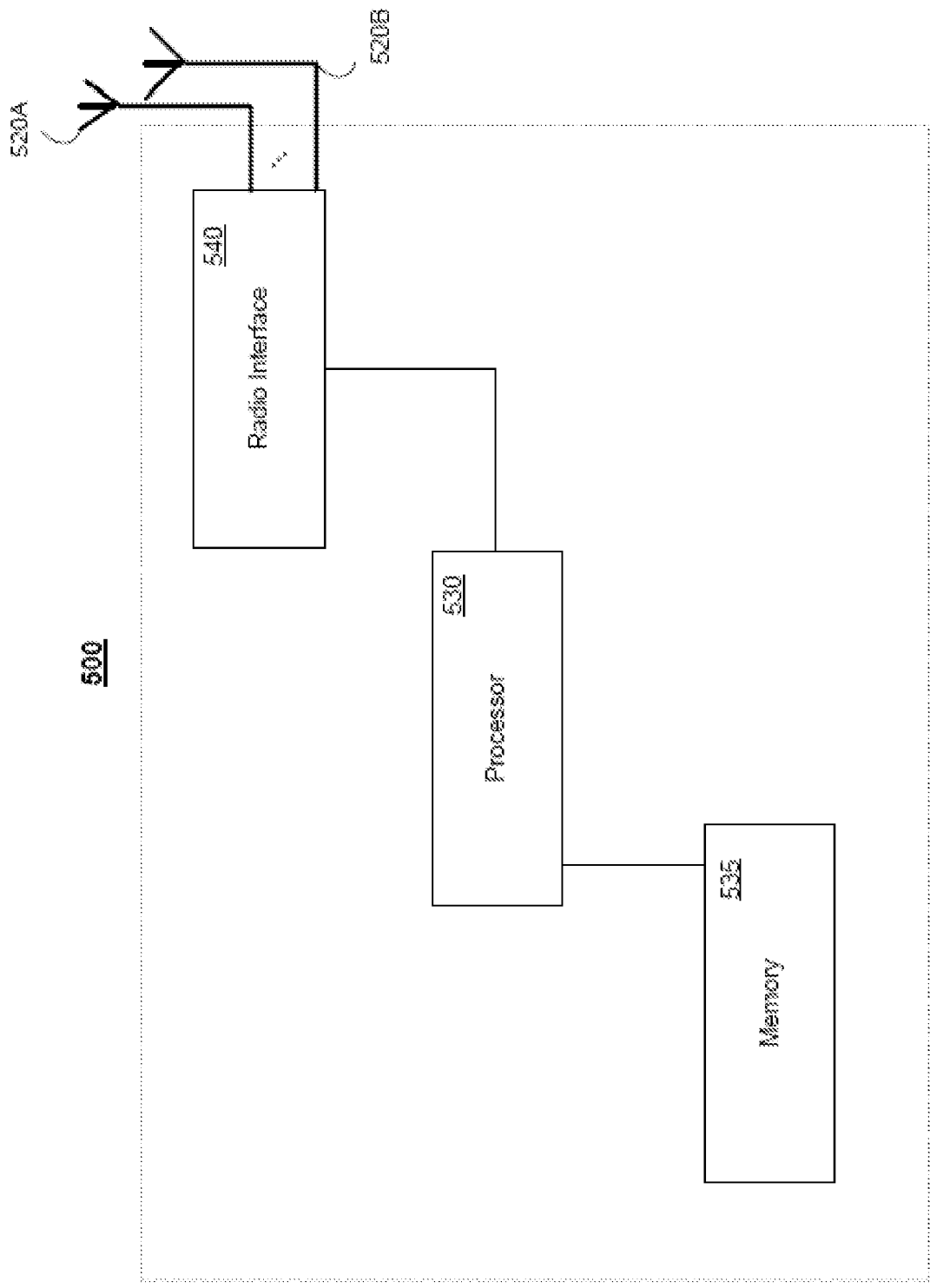
FIG. 4 depicts an example of a network node, such as a base station, in accordance with some exemplary embodiments.

FIG. 4 depicts an example implementation of a wireless access point 500, which may be implemented at for example base station 110A, B, and/or C in accordance with some example embodiments. The wireless access point may include one or more antennas 520 configured to transmit via downlinks and configured to receive uplinks via the antenna (s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to the network at process 200 including for example sending, by a base station, measurement configuration information including at least one value for a first type of reference signal received quality measurement; and sending, by a base station, an offset to signal a user equipment to use a second type of reference signal received quality measurement at the user equipment.

Without in any way limiting the scope, interpretation, or application of the claims appearing below, a technical effect of one or more of the example embodiments disclosed herein allowing the use of different RSRQ metrics.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
receiving, at a user equipment and from a base station, measurement configuration information including at least one value, the at least one value configuring a first type of measurement at the user equipment, the first type of measurement comprising a first type of reference signal received quality measurement;
detecting, by the user equipment, an offset received from the base station, the offset comprising an adjustment for the received at least one value, the offset indicating a second type of measurement to be activated at the user equipment;
adjusting, by the user equipment, the at least one value in accordance with the detected offset to correspond to the second type of measurement, the second type of measurement comprising a second type of reference signal received quality measurement; and
activating, by the user equipment, the second type of reference signal received quality measurement configured with the adjusted at least one value.

2. The method of claim 1, wherein the first type of reference signal received quality measurement is determined based on a reference symbol received power divided by a received signal strength indicator, wherein the received signal strength indicator is measured from symbols only in which common reference symbols are present.

3. The method of claim 1, wherein the second type of reference signal received quality measurement is determined based on a reference symbol received power divided by a received signal strength indicator, wherein the received signal strength indicator is measured from all of the symbols of a subframe.

4. The method of claim 1, wherein the adjusting is specific to at least one of one or more cells, one or more carriers and one or more measurement events.

5. The method of claim 1, wherein when the offset is detected, the user equipment determines that the second type of reference signal received quality measurement is to be activated at the user equipment.

6. An apparatus, comprising:
at least one processor; and
at least one memory including computer program code, the at least one memory and the computer program code configured to, with the at least one processor, cause the apparatus to at least:
receive, at the apparatus and from a base station, measurement configuration information including at least one value, the at least one value configuring a first type of measurement at the apparatus, the first type of measurement comprising a first type of reference signal received quality measurement;
detect an offset received from the base station, the offset comprising an adjustment for the received at least one value, the offset indicating a second type of measurement to be activated at the apparatus;
adjust the at least one value in accordance with the detected offset to correspond to the second type of measurement, the second type of measurement comprising a second type of reference signal received quality measurement; and
activate the second type of reference signal received quality measurement configured with the adjusted at least one value.

7. The apparatus of claim 6, wherein the first type of reference signal received quality measurement is determined based on a reference symbol received power divided by a received signal strength indicator, wherein the received signal strength indicator is measured from symbols only in which common reference symbols are present.

8. The apparatus of claim 6, wherein the second type of reference signal received quality measurement is determined based on a reference symbol received power divided by a received signal strength indicator, wherein the received signal strength indicator is measured from all of the symbols of a subframe.

9. The apparatus of claim 6, wherein the adjusting is specific to at least one of one or more cells, one or more carriers and one or more measurement events.

10. The apparatus of claim 6, wherein when the offset is detected, the apparatus determines that the second type of reference signal received quality measurement is to be activated at the apparatus.

11. The apparatus of claim 6, wherein the detecting further comprises
detecting an indicator representative the second type of reference signal received quality measurement being activated at the apparatus.

12. The apparatus of claim 11, wherein when the apparatus does not receive at least one of the indicator or the offset, the apparatus enables the first type of reference signal received quality measurement.

13. The apparatus of claim 11, wherein the apparatus is further configured to at least measure a difference between the first type of reference signal received quality measurement and the second type of reference signal received quality measurement.

14. A method comprising:
sending, by a base station and to a user equipment, measurement configuration information including at least one value, the at least one value configuring a first type of measurement at the user equipment, the first type of measurement comprising a first type of reference signal received quality measurement; and
sending, by the base station and to the user equipment, an offset, the offset indicating a second type of measurement to be activated at the user equipment, the second type of measurement comprising a second type of reference signal received quality measurement, the offset comprising an adjustment for the at least one value to correspond to the second type of reference signal received quality measurement.

15. The method of claim 14, wherein the first type of reference signal received quality measurement is determined based on a reference symbol received power divided by a received signal strength indicator, wherein the received signal strength indicator is measured from symbols only in which common reference symbols are present.

16. The method of claim 14, wherein the offset is specific to one or more cells, one or more carriers, one or more measurement events, or a combination thereof.

17. An apparatus, comprising:
at least one processor; and
at least one memory including computer program code, the at least one memory and the computer program code configured to, with the at least one processor, cause the apparatus to at least:
send, to a user equipment, measurement configuration information including at least one value, the at least one value configuring a first type of measurement at the user equipment, the first type of measurement comprising a first type of reference signal received quality measurement; and send, to the user equipment, an offset, the offset indicative of a second type of measurement to be activated at the user equipment, the second type of measurement comprising a second type of reference signal received quality measurement, the offset comprising an adjustment for the at least one value to correspond to the second type of reference signal received quality measurement.

18. The apparatus of claim 17, wherein the first type of reference signal received quality measurement is determined based on a reference symbol received power divided by a received signal strength indicator, wherein the received signal strength indicator is measured from symbols only in which common reference symbols are present.

19. The apparatus of claim 17, wherein the second type of reference signal received quality measurement is determined based on a reference symbol received power divided by a received signal strength indicator, wherein the received signal strength indicator is measured from all of the symbols of a subframe.

20. The apparatus of claim 17, wherein the offset is specific to one or more cells, one or more carriers, one or more measurement events, or a combination thereof.

* * * * *